United States Patent
Barthwal et al.

(10) Patent No.: US 11,122,217 B2
(45) Date of Patent: Sep. 14, 2021

(54) METHOD AND SYSTEM FOR AUTOMATICALLY ADDING EFFECT WHILE RECORDING

(71) Applicant: Samsung Electronics Co., Ltd., Gyeonggi-do (KR)

(72) Inventors: Nitin Barthwal, Uttar Pradesh (IN); Ravindra Jain, Uttar Pradesh (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/579,312

(22) Filed: Sep. 23, 2019

(65) Prior Publication Data

US 2020/0099868 A1    Mar. 26, 2020

(30) Foreign Application Priority Data

Sep. 21, 2018 (IN) .............................. 201841035639

(51) Int. Cl.
*H04N 5/262* (2006.01)
*G06K 9/00* (2006.01)
*H04N 21/472* (2011.01)

(52) U.S. Cl.
CPC ....... *H04N 5/2621* (2013.01); *G06K 9/00201* (2013.01); *G06K 9/00711* (2013.01); *H04N 21/47205* (2013.01)

(58) Field of Classification Search
CPC ........... H04N 5/2621; H04N 21/47205; H04N 5/23238; G06K 9/00201; G06K 9/00711; G11B 27/28; G11B 27/031; A63B 2220/807; A63B 2220/806
See application file for complete search history.

(56) References Cited

U.S. PATENT DOCUMENTS

| 5,564,698 A * | 10/1996 | Honey ............... A63B 24/0021 |
| | | 348/E5.051 |
| 8,243,180 B2 | 8/2012 | Sugino |
| 9,686,463 B2 | 6/2017 | Deng et al. |
| 9,716,825 B1 | 7/2017 | Manzeri et al. |
| 2015/0063785 A1 | 3/2015 | Lee et al. |
| 2016/0094790 A1* | 3/2016 | Yu .................... H04N 5/232945 |
| | | 348/169 |
| 2017/0007902 A1* | 1/2017 | Cottam ................... H04M 1/04 |
| 2017/0064206 A1 | 3/2017 | Ku et al. |

(Continued)

FOREIGN PATENT DOCUMENTS

| KR | 20170025177 | 3/2017 |
| KR | 20170075579 | 7/2017 |

(Continued)

OTHER PUBLICATIONS

European Search Report dated Feb. 13, 2020 issued in counterpart application No. 19198750.2-1209, 8 pages.

*Primary Examiner* — Mekonnen D Dagnew
(74) *Attorney, Agent, or Firm* — The Farrell Law Firm, P.C.

(57) ABSTRACT

An electronic device and a method for adding an effect while recording are provided. The method includes previewing a scene in a field of view (FOV) of a camera of an electronic device; detecting available objects in the previewed scene; identifying that at least two objects from among the available objects meet an object criteria; and applying one or more effects on the at least two objects based on the object criteria.

15 Claims, 14 Drawing Sheets

(56) References Cited

U.S. PATENT DOCUMENTS

2018/0027186 A1  1/2018  Jung et al.
2018/0191962 A1* 7/2018  Javier .................. H04N 5/2621

FOREIGN PATENT DOCUMENTS

KR      20170099088     8/2017
KR      20180010042     1/2018
WO   WO 2016/064248    4/2016

* cited by examiner

METHOD AND SYSTEM FOR AUTOMATICALLY ADDING EFFECT WHILE RECORDING

CROSS-REFERENCE TO RELATED APPLICATION(S)

This application is based on and claims priority under 35 U.S.C. § 119 to Indian Patent Application No.: 201841035639, which was filed in the Indian Patent Office on Sep. 21, 2018, the entire disclosure of which is incorporated herein by reference.

BACKGROUND

1. Field

The disclosure relates generally to an interactive system, and more particularly, to a method, an electronic device, or a system for adding an effect while recording.

2. Description of Related Art

In general, an electronic device lacks intelligence to perform an action (e.g., visual effect, audio effect, etc.) based on object detection from a viewfinder and their interaction thereafter. The electronic device is mainly focused on capturing an image and does not automatically introduce or add any real time effects based on identifying interactions between certain objects in the captured image/video.

During a video recording process, the user of the electronic device cannot associate the object with another to perform some action intelligently from the viewfinder.

In a conventional electronic device, it is not possible to highlight or track a moving object. Currently, there is no option to add or hide object information while recording the video, nor is it possible for a user to add effects based on conditions related to objects interaction while recording a live video. Also, there is no such mechanism that allows the user to interact and make the system responsive and more informative to the viewers while capturing the video from an image capturing device.

SUMMARY

The present disclosure has been made to address the above-mentioned problems and disadvantages, and to provide at least the advantages described below.

An aspect of the disclosure is to provide a method for automatically adding an effect while recording in an electronic device.

Another aspect of the disclosure is to detect at least two objects available in a scene previewed in a field of view (FOV) of a camera.

Another aspect of the disclosure is to determine that at least two objects available in a scene meet an object criteria.

Another aspect of the disclosure is to generate object criteria based on a group and an effect.

Another aspect of the disclosure is to store object criteria in an electronic device.

Another aspect of the disclosure is to automatically apply an effect on at least two detected objects previewed in an FOV of a camera based on object criteria.

Another aspect of the disclosure is to produce a multimedia file by automatically packaging an applied effect with at least two detected objects in a scene.

Another aspect of the disclosure is to store a multimedia file with an applied effect on at least two detected objects in a scene in an electronic device.

In accordance with an aspect of the disclosure, a method is provided for adding an effect while recording in an electronic device. The method includes previewing a scene in a field of view (FOV) of a camera of the electronic device; detecting available objects in the previewed scene; identifying that at least two objects from among the available objects meet an object criteria; and applying one or more effects on the at least two objects based on the object criteria.

In accordance with another aspect of the disclosure, a method is provided for adding an effect while recording in an electronic device. The method includes previewing a first scene in a field of view (FOV) of a camera of an electronic device; detecting a user input on a candidate object in the first scene; identifying coordinate information of the candidate object in the first scene; identifying and displaying a plurality of objects related to the candidate object; detecting at least one object selected from the plurality of objects related to the candidate object; forming a group of the at least one object and the candidate object; detecting at least one effect to be applied, selected from a plurality of effects; generating an object criteria based on the group and the at least one effect to be applied; and storing the object criteria in the electronic device.

In accordance with another aspect of the disclosure, an electronic device is provided for adding an effect while recording. The electronic device includes a display; a camera; and a processor configured to: preview a scene in a field of view (FOV) of the camera, detect available objects in the previewed scene, identify that the at least two objects from among the available objects meet an object criteria, and apply one or more effects on the at least two objects based on the object criteria.

In accordance with another aspect of the disclosure, an electronic device is provided for adding an effect while recording. The electronic device includes a display; a camera; and a processor configured to preview a first scene in a field of view (FOV) of the camera, detect a user input on a candidate object in the first scene, identify coordinate information of the candidate object in the first scene, identify and displaying a plurality of objects related to the candidate object, detect at least one object selected from the plurality of objects related to the candidate object, form a group of the at least one object and the candidate object, detect at least one effect to be applied, selected from a plurality of effects, generate an object criteria based on the group and the at least one effect to be applied, and store the object criteria in the electronic device.

In accordance with another aspect of the disclosure, a non-transitory computer-readable storage medium is provided for storing instructions configured to cause at least one processor to perform at least one operation when executed by the at least one processor. The at least one operation includes previewing a scene in a field of view (FOV) of a camera of an electronic device; detecting available objects in the previewed scene; identifying that at least two objects from among the available objects meet an object criteria; and applying one or more effects on the at least two objects based on the object criteria.

BRIEF DESCRIPTION OF FIGURES

The above and other aspects, features, and advantages of certain embodiments of the disclosure will be more apparent from the following description taken in conjunction with the accompanying drawings, in which.

DETAILED DESCRIPTION OF INVENTION

Figure 1:
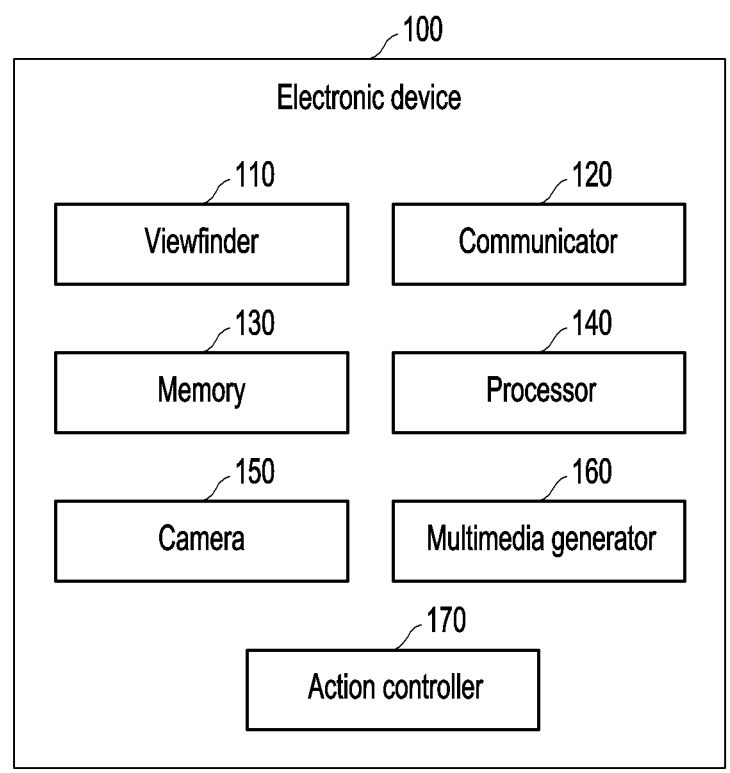
FIG. 1 illustrates an electronic device for automatically adding an effect while recording, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments.

The term "or" as used herein, refers to a non-exclusive or, unless otherwise indicated.

The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units, modules, etc., are physically implemented by analog or digital circuits such as logic gates, integrated circuits, microprocessors, microcontrollers, memory circuits, passive electronic components, active electronic components, optical components, hardwired circuits, etc., and may optionally be driven by firmware and software. The circuits may be embodied in one or more semiconductor chips, or on substrate supports such as printed circuit boards, etc. The circuits constituting a block may be implemented by dedicated hardware, or by a processor (e.g., one or more programmed microprocessors and associated circuitry), or by a combination of dedicated hardware to perform some functions of the block and a processor to perform other functions, of the block. Each block of an embodiment may be physically separated into two or more interacting and discrete blocks without departing from the scope of the disclosure. Likewise, blocks of an embodiment may be physically combined into more complex blocks without departing from the scope of the disclosure The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc., may be used herein to describe various elements, these elements should not be limited by these terms. Instead, these terms are generally used to distinguish one element from another.

In accordance with an aspect of the disclosure, a method is provided for automatically adding an effect while recording. The method includes previewing, by a viewfinder, a scene in a FOV of a camera of an electronic device. The method includes detecting, by the viewfinder, at least two objects available in the scene previewed in the FOV of the camera, and determining, by the viewfinder, that at least two detected objects available in the scene meet an object criteria. The method also includes automatically applying, by the viewfinder, the effect on the at least two detected objects previewed in the FOV of the camera based on the object criteria.

Unlike conventional methods and conventional systems, the method can be used to generate a customized video recording and video watching in an effective, interactive and user friendly manner. The method can be used to analyze a digital image and identify objects of user's interests in the digital image and perform effects on the digital image based on the objects' interaction with each other. This results in enhancing the viewing experience of the user.

In accordance with an aspect of the disclosure, various effects are generated based on an environment being captured and object detected in the video. The method allows or debars content visibility based on the object detection. The method can be used to share only part of video which interested by a particular person instead of complete video. The method can be used to generate the customized video recording and video watching based on the interested portion liked by the particular person instead of complete video. This will reduce the computation process and produce the video in a quick manner.

In accordance with an aspect of the disclosure, an electronic device can add an effect and change settings according to the situation/event. The electronic device can show or hide details/objects when required. The conditions and effects may be mentioned by the user in the preview window itself. While recording, the user of the electronic device does not interact with the video. The electronic device will intelligently understand the scene and the subject of interest and based on the user interest, can take actions making the video more interactive and user friendly.

A method in accordance with an aspect of the disclosure does not attempt to control the volume intensity of any of an audio source present within the image/video or require any control screen to be displayed during recording to control the audio output. Accordingly, the method can be used to generate a customized video recording and video watching in an effective and interactive manner without altering the object within the image/video and changing a camera angle.

In accordance with an aspect of the disclosure, instead of generating an action based on touching a touch spot of the image/video, user selected objects belonging to a group result in execution of the action based upon fulfilling of a condition preset by the user before the start of the recording. For example, each time a preset condition is fulfilled, the same effect or action may be performed without any calculation of intensity and/or user inputs.

FIG. 1 illustrates an electronic device for automatically adding an effect while recording, according to an embodiment.

Referring to FIG. 1, the electronic device 100 may be a cellular phone, a smart phone, a personal digital assistant (PDA), a tablet computer, a laptop computer, an edge based smart phone, a multi-window smart phone, etc.

The electronic device 100 includes a viewfinder 110, a communicator 120, a memory 130, a processor 140, a camera 150, a multimedia generator 160, and an action controller 170. The processor 140 is operated with the viewfinder 110, the communicator 120, the memory 130, the camera 150, the multimedia generator 160, and the action controller 170.

The viewfinder 110 is configured to preview a scene in an FOV of the camera 150. The camera 150 may be a dual camera, a video camera, a 360 degree camera, etc. The viewfinder 110 is configured to detect at least two objects available in the scene previewed in the FOV of the camera 150 and determine that at least two detected objects available in the scene meet an object criteria. For example, while recording a cricket match, an object can be a bat, a ball, a boundary line, a cricket pad, etc.

The object criteria may include information about a group of objects and an effect to be applied, wherein the information about the group of objects indicates at least one of availability of the object in the group, a coordinate information of the object in the group, and a non-availability of the object in the group.

The object criteria may be created by previewing the scene in the FOV of the camera 150, detecting a user input on a candidate object (e.g., a bat) in the scene previewed in the FOV, determining coordinate information of the candidate object in the scene, determining and displaying a plurality of objects (e.g., ball, boundary line, cricket pad, etc.) related to the candidate object, detecting at least one object selected from the plurality of objects related to the candidate object, forming a group by grouping the at least one selected object and the candidate object, detecting the at least one effect selected from a plurality of effects, generating the object criteria based on the group and the effect, and storing the object criteria in the electronic device.

The viewfinder 110 is configured to determine whether the object from the at least two objects matches with at least one object of the group defined in the object criteria, and determine that the at least two detected objects available in the scene meet the object criteria based on the match.

The viewfinder 110 is configured to determine coordinate information of a first detected object from the at least two detected objects and coordinate information of a second detected object from the at least two detected objects in the scene previewed in the FOV of the camera. The viewfinder 110 is configured to determine a match between the coordinate information of the first detected object and the second detected object and coordinate information of a first object and a second object of the group defined in the object criteria. Further, the viewfinder 110 is configured to determine that the first object and the second object available in the scene meet the object criteria based on the match.

The viewfinder 110 is configured to determine whether at least one object of the group defined in the object criteria is not available in the scene previewed in the FOV based on the at least two detected objects in the scene and determine that the at least two detected objects available in the scene meet the object criteria.

The electronic device 100 may identify the object in the viewfinder 110 using a convolutional neural network and a deep learning model. The convolutional neural network includes a convolution layer, a sub-sampling layer, and a fully connected layer. The convolutional neural network learns the values of the images/video during a training process. The convolution layer extracts features from the input image and the sub-sampling layer allows number of features to be diminished. The fully connected layer classifies the input image into various classes based on the training dataset.

Figure 9A:
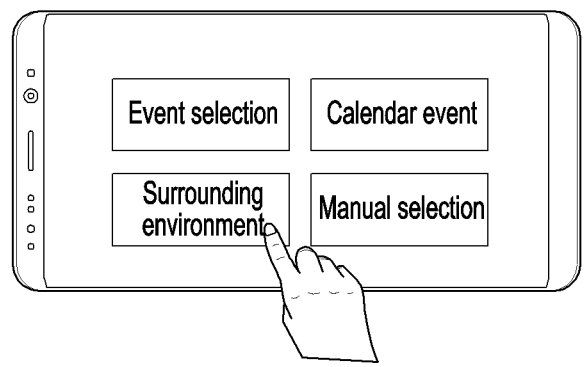
FIGS. 9A to 9C illustrate screen images of an electronic device automatically adding an effect based on a surrounding environment while recording, according to an embodiment.
Figure 9B:
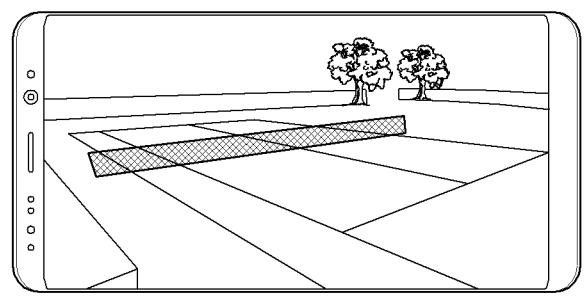
Figure 9C:
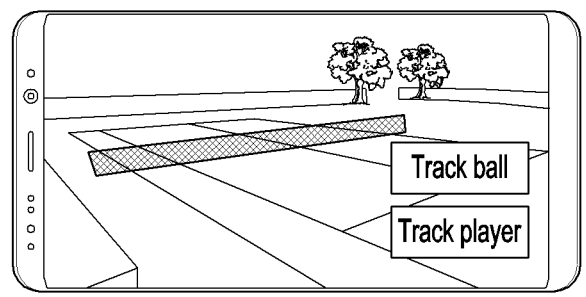

FIGS. 9A to 9C illustrate screen images of an electronic device automatically adding an effect based on a surrounding environment while recording, according to an embodiment.

Referring to FIGS. 9A to 9C, in an example, tennis court images feed into a training set. The deep learning model is trained to detect a tennis court. Further, if the user of the electronic device 100 starts recording a tennis match, the electronic device 100 feeds a camera image to the trained deep learning model. The trained deep learning model is applied on the image. The electronic device 100 detects the inference for different surroundings and matches it with the training data set. The electronic device 100 predicts the surroundings and load effects accordingly.

The following steps may be involved while applying the convolutional neural network to the viewfinder image.

1) Capture image selected in the viewfinder 110.
2) Divide the image into 3 channels red, green, blue (RGB) n_H×n_W×n_C, where n_=3.
3) Apply convolution with an F×F size filter.
4) Perform max pooling to reduce an output size with all features preserved
5) Repeat 3 and 4 steps.
6) Expand the activation into the fully connected layer.

The following rules may be applied for grouping objects.

a) Add multiple objects to same group, if the objects are related.
b) Add objects to different group, if the objects are mutually exclusive.
c) Only objects within same group will be checked for condition fulfillment.

d) Each group must have at least one object.

The object criteria may be determined based on motion, distance, proximity, presence, etc., of the object in comparison to a second object in the digital image. The viewfinder 110 is configured to analyze the physical properties of the object including shape, size, color, motion, and position of the object within the image.

The viewfinder 110 is configured to automatically apply the effect on the at least two detected objects previewed in the FOV of the camera 150 based on the object criteria. The effect may be a visual effect, an audio effect, an audio-visual effect, and/or a haptic effect.

The user of the electronic device 100 may apply effects by performing a gesture (e.g., a long press) on the group to which the user wants to add effects. Alternatively, the user may apply the effects based on the machine learning.

Based on the gesture operation, the electronic device 100 displays a condition and effects selection window on a display screen. From the condition and effects selection window, the user of the electronic device 100 may select effects/actions to associate with a condition. The effect will we displayed when condition is fulfilled.

The viewfinder 110 may be operated with an object identification unit, an object processing unit, and an effect processing and generation unit.

The object identification unit identifies the object present in the image with the help of multiple object identification logics, face recognition logics, motion detection logics, virtual tripwires, etc. The object processing unit receives the input from the object identification unit. The object processing unit groups various objects into different groups.

The effect processing and generation unit performs effect processing and generating, after the object processing unit creates the groups for the condition, based on which the effect is displayed. Upon successful meeting of the criteria of the condition, the mapped effect will be displayed. The effect is also defined to be performed on the object or the video frame as a whole.

Based on the selected event, corresponding conditions and the effects may be loaded and mapped automatically based on a calendar event and a social networking website. Based on the selected event, corresponding conditions and the effects may be loaded and mapped automatically based on a surrounding environment.

The multimedia generator 160 is configured to produce a multimedia file by automatically packaging the applied effect with the at least two detected objects in the scene. The memory 130 is configured to store the multimedia file with the applied effect on the at least two detected objects in the scene in the electronic device 100. Further, the action controller 170 is configured to automatically perform an action.

The action may be sharing at least one portion of the multimedia including the applied effect on the at least two detected objects in the scene, and a notification about at least one portion of the multimedia including the applied effect on the at least two detected objects in the scene.

The processor 140 is configured to execute instructions stored in the memory 130 and to perform various processes.

The communicator 120 is configured for communicating internally between internal hardware components and with external devices via one or more networks.

The memory 130 stores the effect and condition. The memory 130 also stores instructions to be executed by the processor 140. The memory 130 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In addition, the memory 130 may be considered a non-transitory storage medium. Herein, the term "non-transitory" may indicate that the storage medium is not embodied in a carrier wave or a propagated signal. However, the term "non-transitory" should not be interpreted that the memory 130 is non-movable.

The memory 130 can be configured to store larger amounts of information than the memory. For example, a non-transitory storage medium may store data that can, over time, change (e.g., in Random Access Memory (RAM) or cache).

For example, in a cricket match, the user of the electronic device 100 selects the cricket ball and the cricket bat in a group. When the ball comes in contact with the bat, a swing effect of the bat can be shown. Also, when the ball is near and in contact to bat display, a series of fire appears in the ball trajectory.

As another example, in the cricket match, the user of the electronic device 100 selects the cricket ball and the boundary line in the group. Thereafter, when ball is sent over the boundary and is not visible, then the electronic device 100 shows some effect.

Although the FIG. 1 illustrates various hardware components of the electronic device 100, it is to be understood that other embodiments are not limited thereon. In other embodiments, the electronic device 100 may include fewer or more components. Further, the labels or names of the components are used only for illustrative purpose and do not limit the scope of the disclosure. One or more components can be combined together to perform same or substantially similar function to automatically add the effect while recording the video/multimedia in the electronic device 100.

Figure 2:
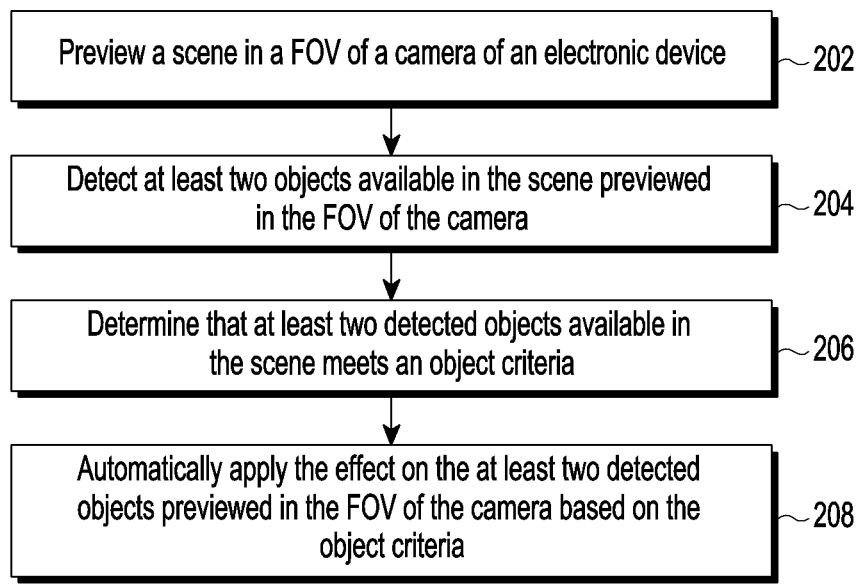
FIG. 2 is a flow diagram illustrating a method for automatically adding an effect while recording a video in an electronic device, according to an embodiment.

FIG. 2 is a flow diagram illustrating a method for automatically adding an effect while recording a video in an electronic device, according to an embodiment. For example, the method of FIG. 2 may be performed by the viewfinder 110 of FIG. 1.

Referring to FIG. 2, in step 202, the method includes previewing a scene in the FOV of the camera 150 of the electronic device 100.

In step 204, the method includes detecting at least two objects available in the scene previewed in the FOV of the camera 150.

In step 206, the method includes determining that the at least two detected objects available in the scene meet the object criteria.

In step 208, the method includes automatically applying an effect on the at least two detected objects previewed in the FOV of the camera 150 based on the object criteria.

Figure 3:
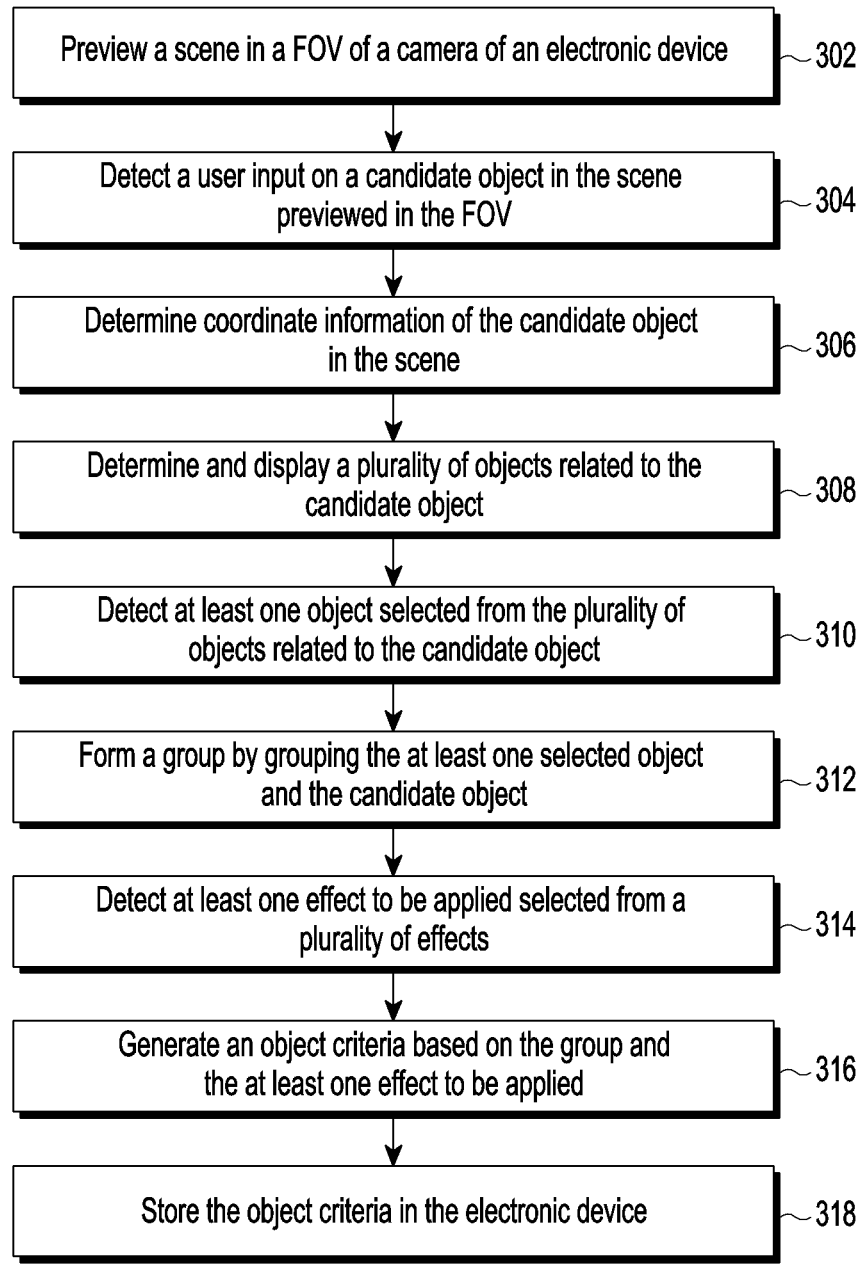
FIG. 3 is a flow diagram illustrating a method for automatically adding an effect while recording a video in an electronic device, according to an embodiment.

FIG. 3 is a flow diagram illustrating a method for automatically adding an effect while recording a video in an electronic device, according to an embodiment. For example, the method of FIG. 3 may be performed by the viewfinder 110 of FIG. 1.

Referring to FIG. 3, in step 302, the method includes previewing a scene in the FOV of the camera 150 of the electronic device 100.

In step 304, the method includes detecting a user input on a candidate object in the scene previewed in the FOV.

In step 306, the method includes determining coordinate information of the candidate object in the scene.

In step 308, the method includes determining and displaying the plurality of objects related to the candidate object.

In step 310, the method includes detecting at least one object selected from the plurality of objects related to the candidate object.

In step 312, the method includes forming a group by grouping the at least one selected object and the candidate object.

In step 314, the method includes detecting at least one effect selected from the plurality of effects.

In step 316, the method includes generating the object criteria based on the group and the effect.

In step 318, the method includes storing the object criteria in the electronic device 100.

Figure 4:
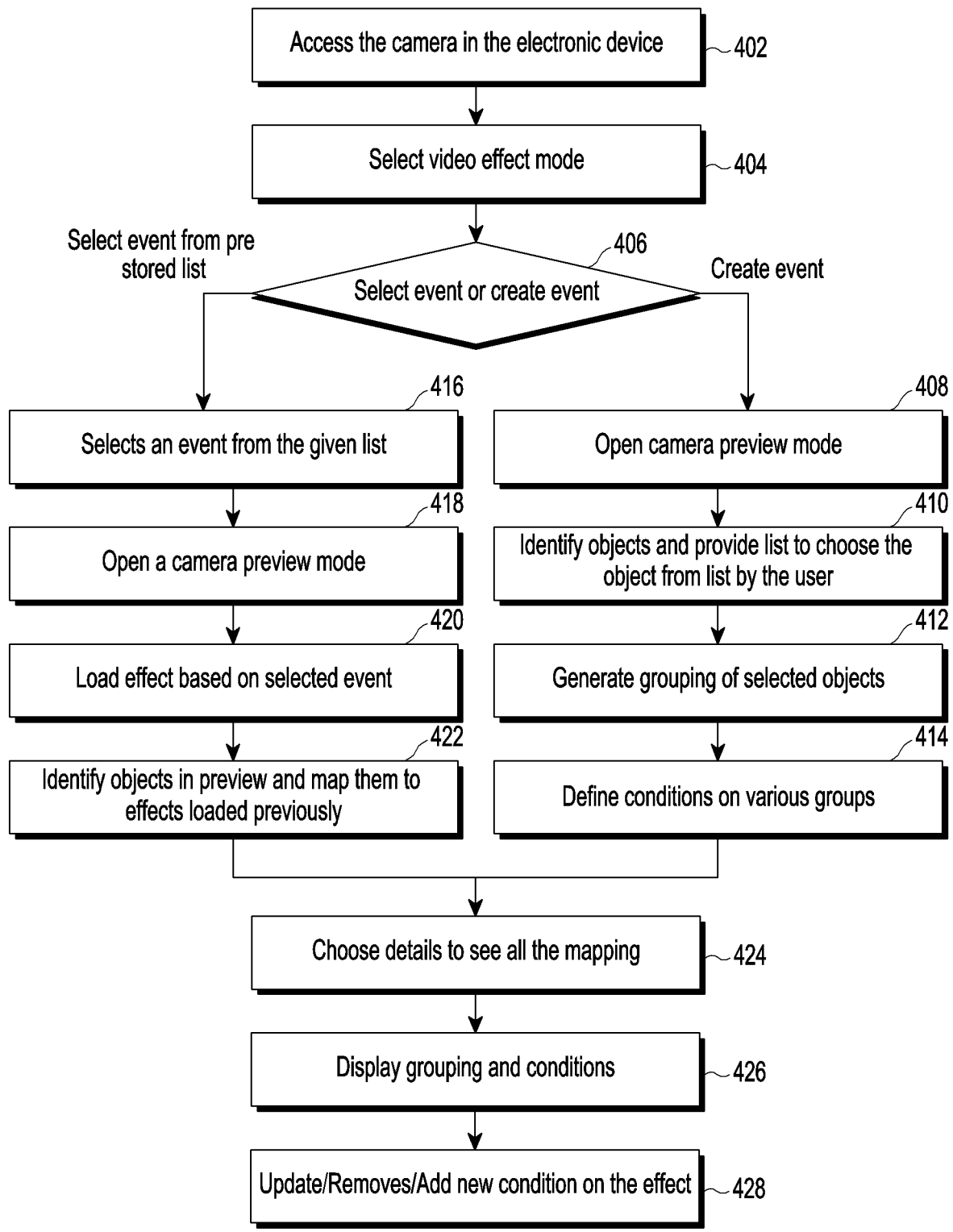
FIG. 4 is a flow diagram illustrating a method for automatically adding an effect based on a created event or a selected event while recording a video in an electronic device, according to an embodiment.

FIG. 4 is a flow diagram illustrating a method for automatically adding an effect based on a created event or selected event while recording a video in an electronic device, according to an embodiment. For example, the method of FIG. 4 may be performed by the viewfinder 110.

Referring to FIG. 4, in step 402, the method includes accessing the camera 150 in the electronic device.

In step 404, the method includes selecting a video effect mode.

In step 406, the method includes determining that the event is detected by the user or the event is created by the user.

If the event is created by the user, then in step 408, the method includes opening a camera preview mode. In step 410, the method includes identifying the objects and providing a list to choose the object from the list by the user. In step 412, the method includes generating and grouping the selected objects. In step 414, the method includes defining conditions on the groups.

If the event is selected by the user from a pre-stored list, then in step 416, the method includes selecting the event from the pre-stored list. In step 418, the method includes opening the camera preview mode. In step 420, the method includes loading the effect based on the selected event. In step 422, the method includes identifying the objects in the preview and mapping them to effects loaded previously.

In step 424, the method includes choosing the details to see all of the mapping.

In step 426, the method includes displaying the information about grouping and conditions.

In step 428, the method includes modifying (e.g., updating/removing/adding) a condition of the effect.

Figure 5:
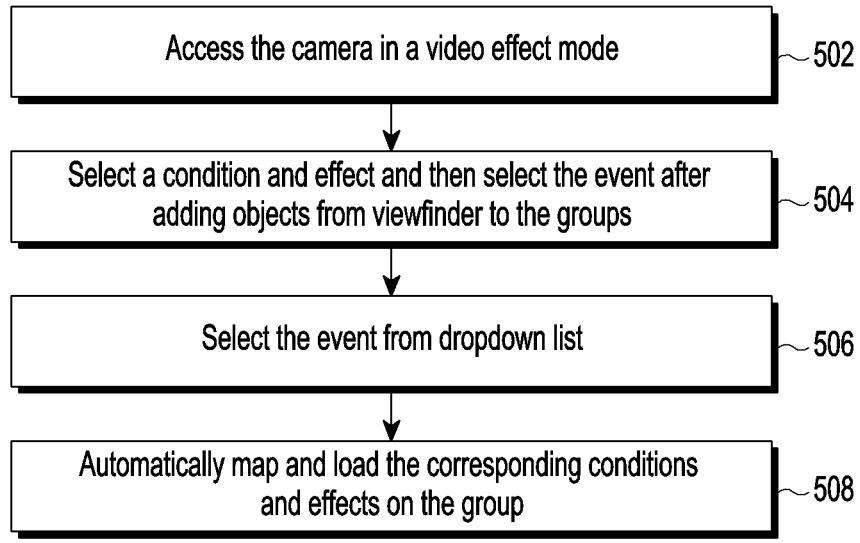
FIG. 5 is a flow diagram illustrating a method for automatically adding an effect based on a selected event while recording a video in an electronic device, according to an embodiment.

FIG. 5 is a flow diagram illustrating a method for automatically adding an effect based on a selected event while recording a video in an electronic device, according to an embodiment. For example, the method of FIG. 5 may be performed by the viewfinder 110.

Referring to FIG. 5, in step 502, the method includes accessing the camera 150 in the video effect mode.

In step 504, the method includes selecting the condition and effect and then selecting the event after adding objects from the viewfinder 110 to the groups.

In step 506, the method includes selecting the event from the dropdown list.

In step 508, the method includes automatically mapping and loading the corresponding conditions and effects on the group.

Figure 6:
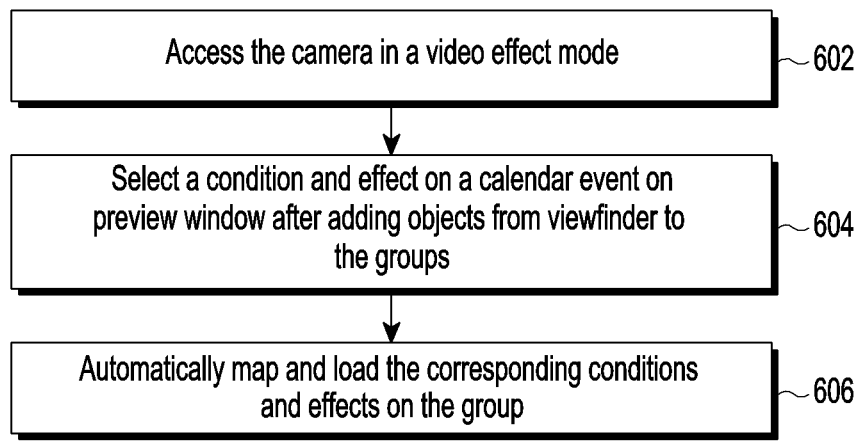
FIG. 6 is a flow diagram illustrating a method for automatically adding an effect based on a calendar event while recording a video in an electronic device, according to an embodiment.

FIG. 6 is a flow diagram illustrating a method for automatically adding an effect based on a calendar event while recording a video in an electronic device, according to an embodiment. For example, the method of FIG. 6 may be performed by the viewfinder 110.

Referring to FIG. 6, in step 602, the method includes accessing the camera in the video effect mode.

In step 604, the method includes selecting the condition and effect on the calendar event on the preview window after adding objects from the viewfinder 110 to the groups.

In step 606, the method includes automatically mapping and loading the corresponding conditions and effects on the group.

Figure 7:
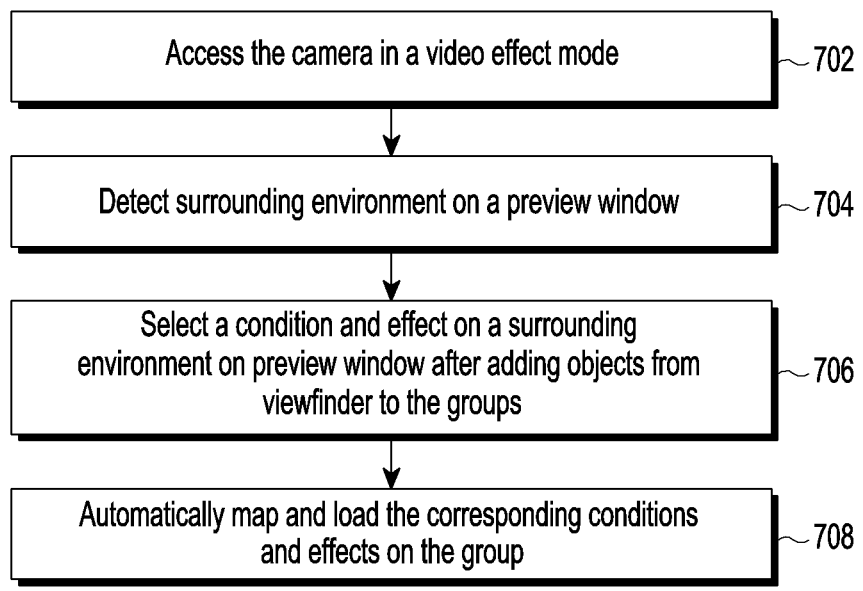
FIG. 7 is a flow diagram illustrating a method for automatically adding an effect based on a surrounding environment while recording a video in an electronic device, according to an embodiment.

FIG. 7 is a flow diagram illustrating a method for automatically adding an effect based on a surrounding environment while recording a video in an electronic device, according to an embodiment. For example, the method of FIG. 7 may be performed by the viewfinder 110.

Referring to FIG. 7, in step 702, the method includes accessing the camera in the video effect mode.

In step 704, the method includes detecting the surrounding environment on the preview window.

In step 706, the method includes selecting the condition and the effect on the surrounding environment on the preview window after adding objects from viewfinder to the groups.

In step 708, the method includes automatically mapping and loading the corresponding conditions and effects on the group.

The various actions, acts, blocks, steps, etc., in FIGS. 2 to 7 may be performed in the order presented, in a different order, or simultaneously. Further, in some embodiments, some of the actions, acts, blocks, steps, etc., may be omitted, added, modified, skipped, etc., without departing from the scope of the disclosure.

FIGS. 8A to 8I illustrate screen images of an electronic device automatically adding an effect while recording, according to an embodiment.

Figure 8A:
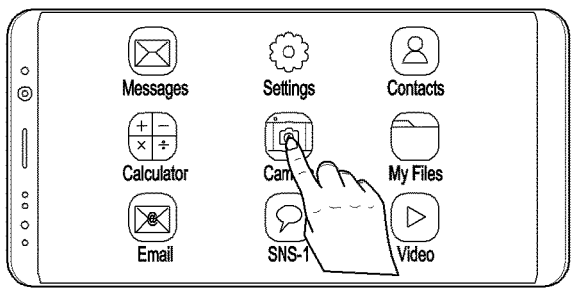
FIGS. 8A to 8I illustrate screen images of an electronic device automatically adding an effect while recording, according to an embodiment.
Figure 8B:
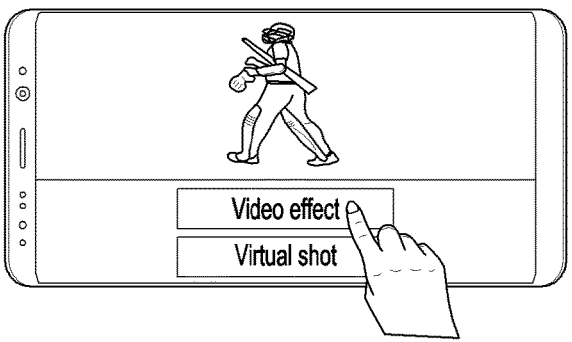

Referring to FIGS. 8A and 8B, the user of the electronic device 100 access a camera in a video effect mode.

Figure 8C:
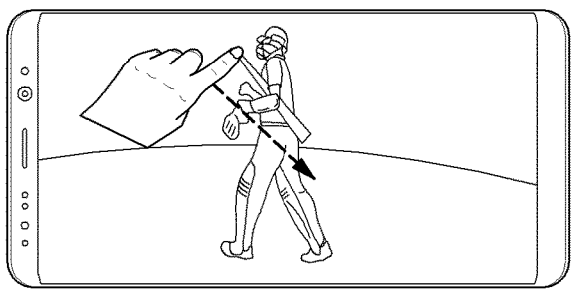

In FIG. 8C, the user selects a candidate object (e.g., a bat) in the viewfinder 110.

Figure 8D:
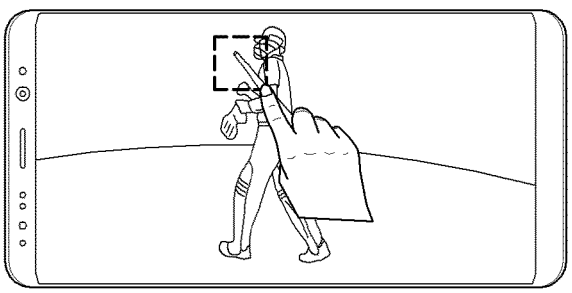
Figure 8E:
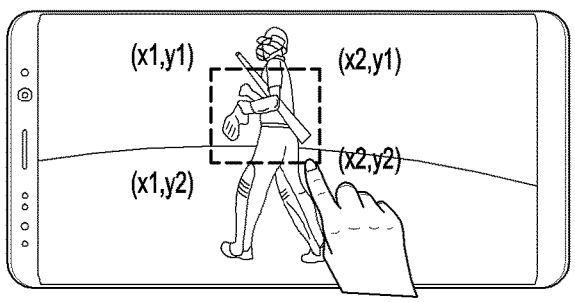

In FIGS. 8D and 8E, the user previews the scene in the FOV of the camera 150 and the electronic device 100 detects the user input on the candidate object in the scene previewed in the FOV. Further, the electronic device 100 determines coordinate information of the candidate object in the scene. The viewfinder coordinates start at (x1,y) and end at (x2,y2), and all of the coordinates include (x1,y1), (x2,y1), (x1,y2), and (x2,y2). The area enclosed in the viewfinder 110 is cropped according to the coordinates.

Figure 8F:
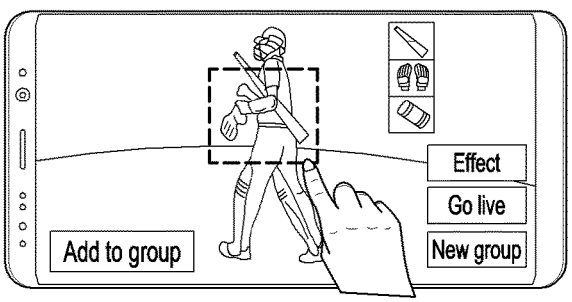

In FIG. 8F, the electronic device 100 determines and displays the plurality of objects (e.g., a pad, gloves, etc.) related to the candidate object. Further, the electronic device 100 detects objects selected from the plurality of objects related to the candidate object and forms a group by grouping the selected object and the candidate object.

Figure 8G:
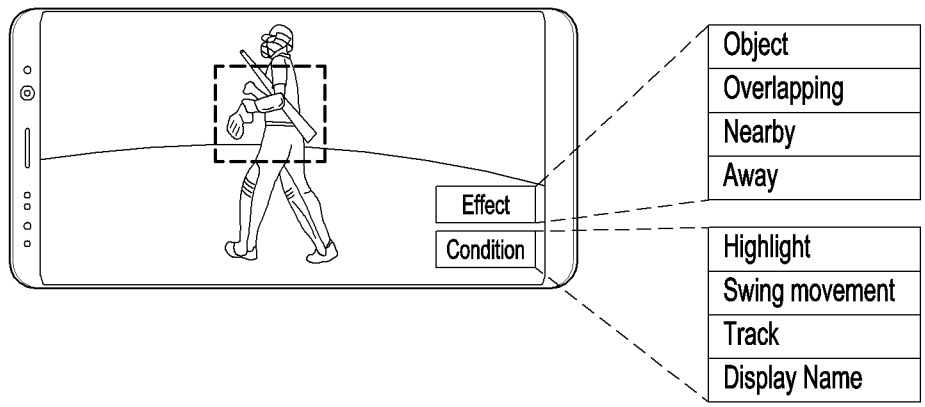

In FIG. 8G, the electronic device 100 detects at least one effect selected from a plurality of effects (e.g., swing effect, trajectory effect, etc.) and generates the object criteria based on the group and the at least one effect.

Figure 8H:
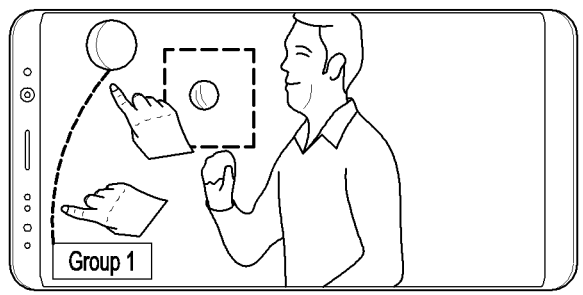

In FIG. 8H, the user selects both the cricket bat and the cricket ball form a first group.

Figure 8I:
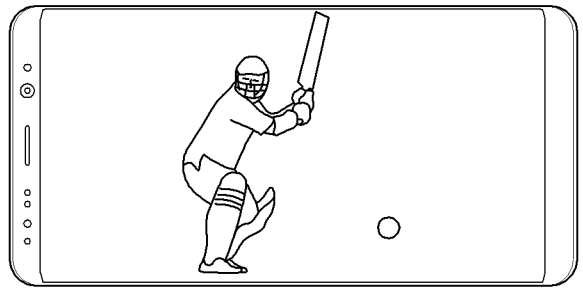

In FIG. 8I, when ball comes in contact with the bat, the swing effect of the bat can be shown. Also, when ball within a predetermined distance of the bat display, a series of fire is displayed in the ball's trajectory.

As described above, FIGS. 9A to 9C illustrate screen images of an electronic device automatically adding an effect based on a surrounding environment while recording, according to an embodiment.

Referring to FIGS. 9A to 9C, the tennis court images feed into the training set. The deep learning model is trained to detect the tennis court. For example, if the user of the electronic device 100 starts recording the tennis match, the electronic device 100 feeds the camera image to the trained deep learning model. The trained deep learning model is applied on the image.

As illustrated in the FIG. 9A, the user selects a surrounding environment mode. The electronic device 100 detects the inference for different surrounding environments and matches it with the training data set.

The electronic device 100 predicts the surroundings and loads effects accordingly as illustrated in FIGS. 9B and 9C.

Figure 10A:
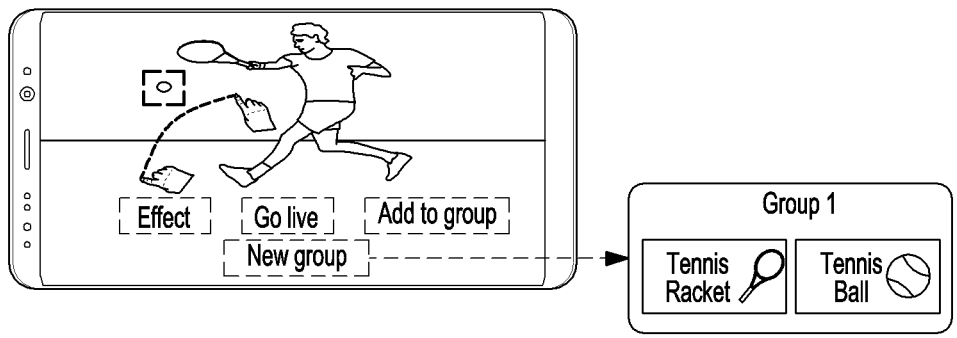
FIGS. 10A to 10C illustrate screen images of an electronic device automatically adding an effect based on a surrounding environment while recording, according to an embodiment.
Figure 10B:
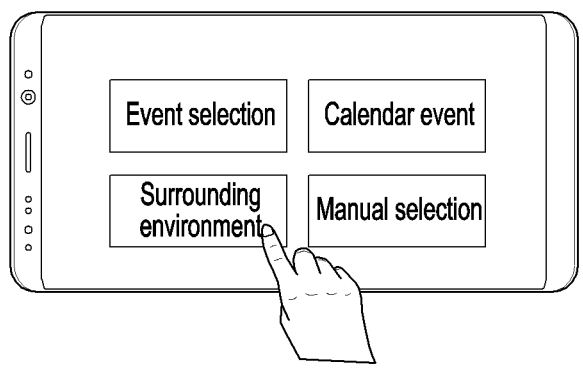
Figure 10C:
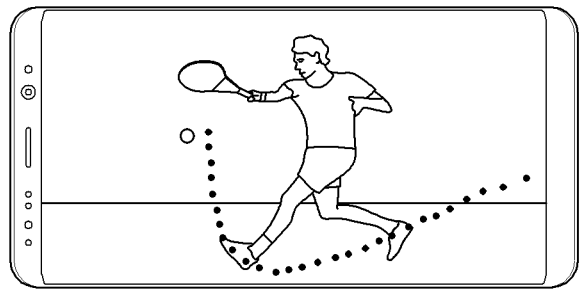

FIGS. 10A to 10C illustrate screen images of an electronic device automatically adding an effect based on a surrounding environment while recording, according to an embodiment.

Referring to FIGS. 10A and 10B, the user of the electronic device 100 groups the objects and selects the surrounding environment mode.

As illustrated in the FIG. 10C, when the user opens the camera 150 in the video effect mode, the electronic device 100 detects the surrounding environment. The electronic device matches the surrounding environment with the data set and displays the possibility about what could be the surroundings. In this example, wherein the user wants to capture the tennis match, when the player hits the ball with the racket, the electronic device 100 displays a trajectory effect on the ball.

Figure 11A:
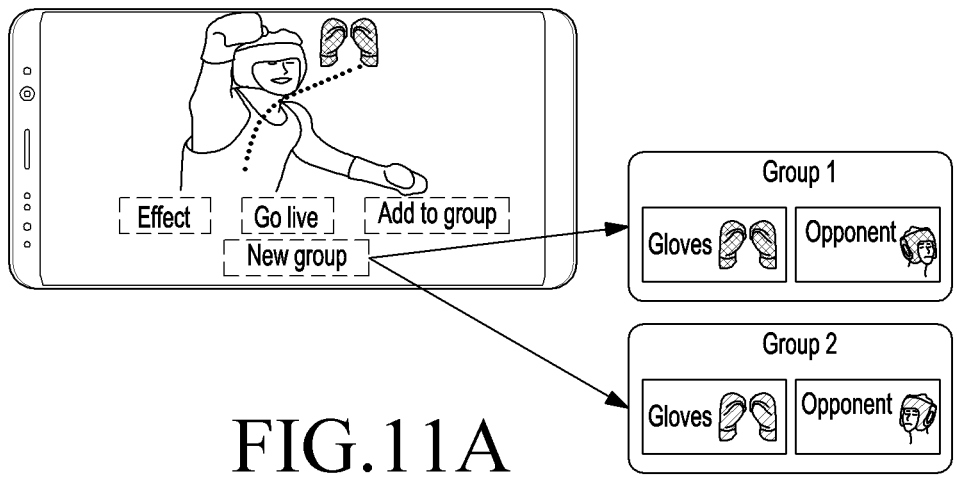
FIGS. 11A to 11C illustrate screen images of an electronic device automatically adding an effect based on a calendar event while recording, according to an embodiment.
Figure 11B:
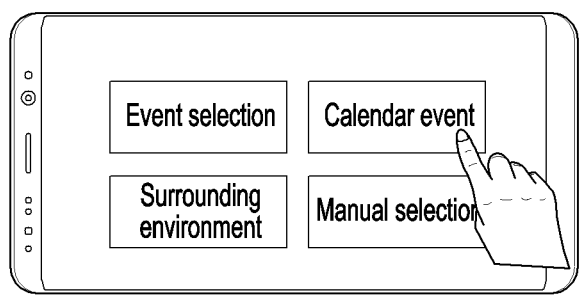
Figure 11C:
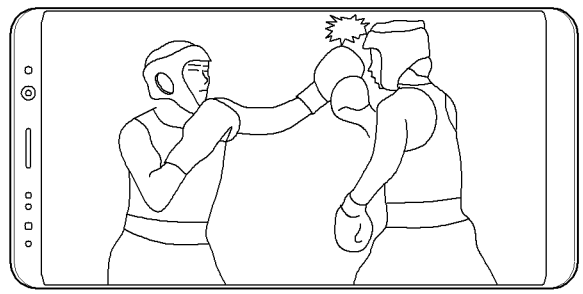

FIGS. 11A to 11C illustrate screen images of an electronic device automatically adding an effect based on a calendar event while recording, according to an embodiment.

Referring to FIG. 11A, the user of the electronic device 100 groups the objects.

As illustrated in FIG. 11B, the user selects the calendar event in the preview window. Further, the electronic device 100 detects the calendar event as boxing. Based on the detected event, the effects and conditions are automatically applied on the object (e.g., if the user wants to capture a boxing match, when a fighter hits another fighter, a solid punch and blast effect may be produced) as illustrated in the FIG. 11C.

Figure 12A:
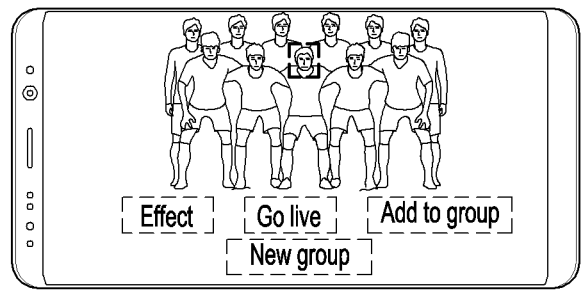
FIGS. 12A to 12C illustrate screen images of an electronic device automatically adding an effect based on tagging a player while recording, according to an embodiment.
Figure 12B:
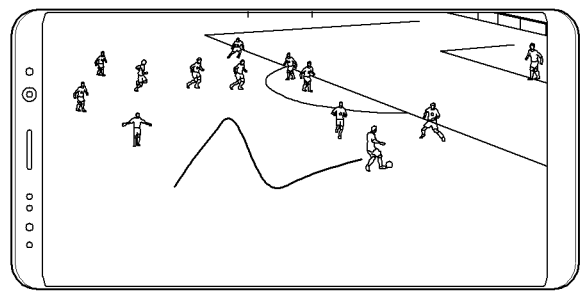
Figure 12C:
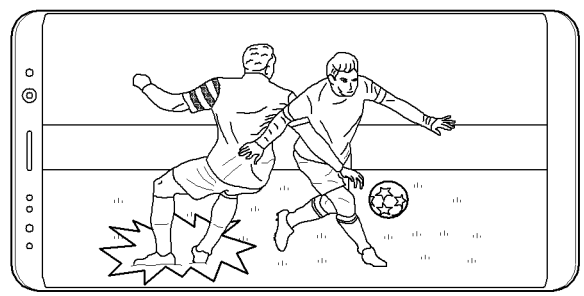
Figure 13A:
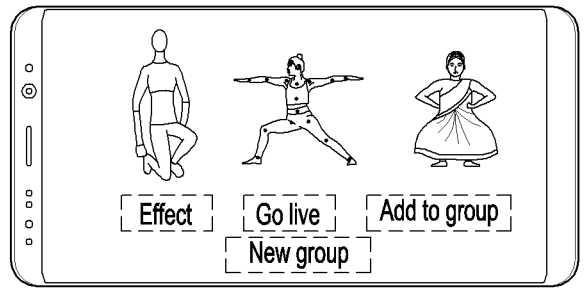
FIGS. 13A to 13D illustrate screen images of an electronic device automatically adding an effect and sharing with another electronic device while recording, according to an embodiment.
Figure 13B:
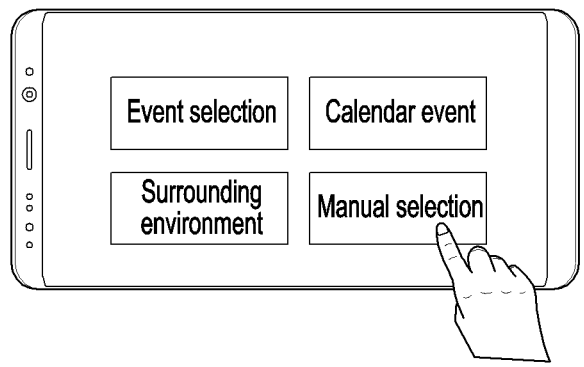
Figure 13C:
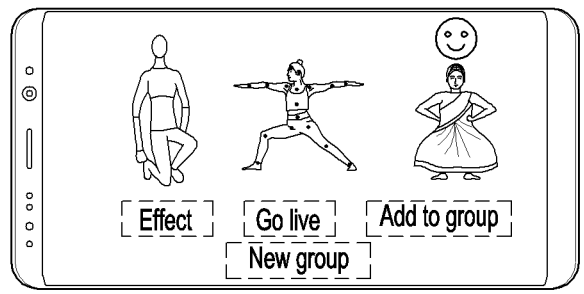
Figure 13D:
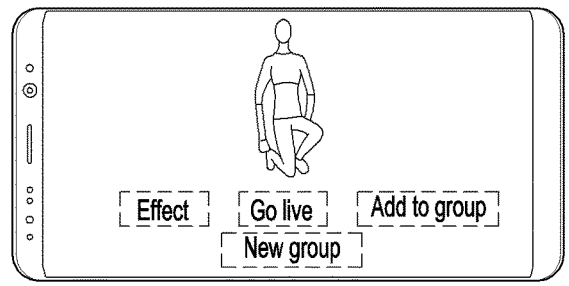
Figure 13D:
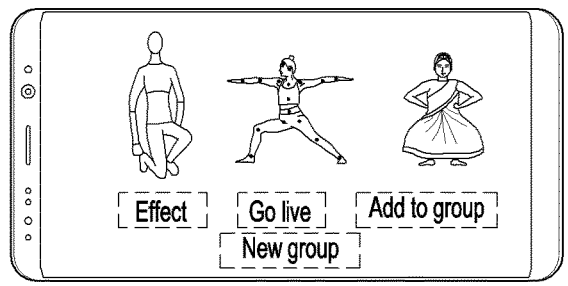
Figure 13D:
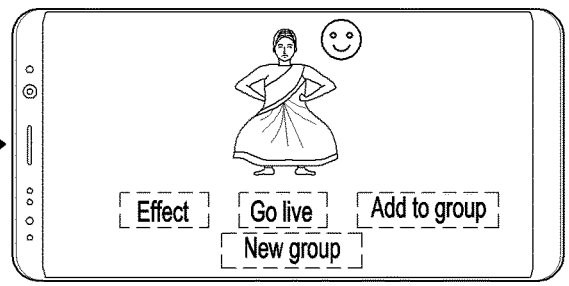
Figure 13D:
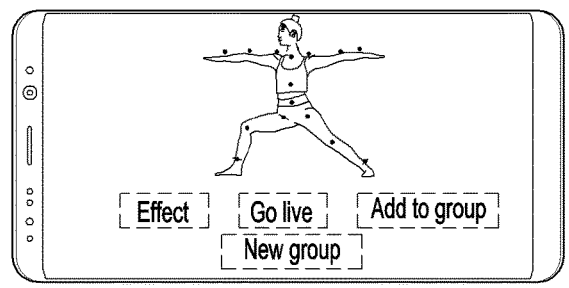

FIGS. 12A to 12C illustrate screen images of an electronic device automatically adding an effect based on tagging a player while recording, according to an embodiment.

Referring to FIGS. 12A to 12C, based on the methods described herein, the electronic device 100 can track a player in a fast changing environment in the match. For example, when the user of the electronic device 100 tags a favorite player in a football match, wherever the favorite player is detected in the match by the camera 150, the camera 150 highlights the player, so that the user can easily identify the player, improving the user experience.

FIGS. 13A to 13D illustrate screen images of an electronic device automatically adding an effect and sharing with another electronic device while recording, according to an embodiment.

Referring to FIGS. 13A to 13D, the electronic device 100 selects a person in the video to whom the user wants to send the video to. For example, when someone captures the video/image, the person who is in the image/video is informed that a film/picture of user has been taken. An easy sharing option will be created and all of the pictures of the user can be shared with the respective person of electronic devices 100b-100d. For example, such a feature may be useful for a dancer in a dance performance who has asked friends to take pictures. When the performance is complete, the dancer gets notifications who has captured pictures. All of the friends can share the pictures/video with her with just a tap, as all of these pictures will be linked.

As another example, based upon the users, a playlist can be associated from a music player application. The electronic device 100 detects a face of the user and then plays different songs based on the person. The user's introduction or name can also be displayed after fetching the details from contacts or social media platform.

As another example, the electronic device notifies parents with image of their children during an activity (e.g., playing, crying, etc.). Parents may receive custom notifications about the activity of their child. If the child is weeping, the electronic device 100 may share a quick notification for the parents to be aware, and the parents can even talk to their child and hear from them.

As another example, the electronic device can be used to automatically add an effect while recording using a virtual assistance application (e.g., Bixby, etc.)

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for adding an effect while recording in an electronic device, the method comprising:
    previewing a scene in a field of view (FOV) of a camera of the electronic device;
    detecting available objects in the previewed scene;
    detecting a user input on a candidate object of the available objects;
    identifying the candidate object in response to detecting the user input, and at least one object associated with the candidate object based on a training dataset, from among the available objects;
    identifying one or more effects to be applied on a group including the candidate object and the at least one object; and
    applying the one or more effects on the group according to an object criteria determined based on first coordinate information associated with a first object included in the group matching second coordinate information associated with a second object included in the group.

2. The method of claim 1, further comprising:
    producing a multimedia file by packaging the one or more effects with the objects included in the group in the scene;
    storing the multimedia file; and
    performing an action related to the multimedia file.

3. The method of claim 2, wherein the action includes at least one of:
    sharing at least one portion of the multimedia file,
    changing a setting in the electronic device, and displaying a notification about the at least one portion of the multimedia file.

4. The method of claim 1, wherein the object criteria is generated by:
- detecting the user input on the candidate object in the previewed scene;
- identifying coordinate information of the candidate object in the previewed scene;
- identifying and displaying a plurality of objects related to the candidate object;
- detecting the at least one object selected from the plurality of objects related to the candidate object;
- forming the group by grouping the at least one object and the candidate object;
- detecting at least one effect selected from a plurality of effects;
- generating the object criteria based on the group and the at least one effect; and
- storing the object criteria in the electronic device.

5. The method of claim 1, wherein the object criteria comprises information about the group and an effect to be applied, and
wherein information about the group indicates at least one of:
- availability of the objects in the group,
- coordinate information of the objects in the group, and
- a non-availability of the objects in the group.

6. The method of claim 1, further comprising at least one of:
- identifying whether the objects included in the group has at least one physical property defined in the object criteria, and identifying that the objects meet the object criteria, or
- identifying first coordinate information of a first object included in the group and second coordinate information of a second object included in the group, identifying a distance between the first coordinate information and the second coordinate information, and identifying whether the first object and the second object meet the object criteria based on the distance.

7. The method of claim 1, wherein the one or more effects comprises at least one of a visual effect, an audio effect, an audio-visual effect, and a haptic effect.

8. An electronic device for adding an effect while recording, the electronic device comprising:
- a display;
- a camera; and
- a processor configured to:
  - preview a scene in a field of view (FOV) of the camera,
  - detect available objects in the previewed scene,
  - detect a user input on a candidate object of the available objects;
  - identify the candidate object in response to detecting the user input, and at least one object associated with the candidate object based on a training dataset, from among the available objects,
  - identify one or more effects to be applied on a group including the candidate object and at least one object, and
  - apply the one or more effects on the group according to an object criteria determined based on first coordinate information associated with a first object included in the group matching second coordinate information associated with a second object included in the group.

9. The electronic device of claim 8, wherein the processor is further configured to:
- produce a multimedia file by packaging the one or more effects with the objects included in the group in the scene,
- store the multimedia file, and
- perform an action related to the multimedia file.

10. The electronic device of claim 9, wherein the action includes at least one of:
- sharing at least one portion of the multimedia file,
- changing a setting in the electronic device, and
- displaying a notification about the at least one portion of the multimedia file.

11. The electronic device of claim 8, wherein the processor is further configured to generate the object criteria by:
- detecting the user input on the candidate object in the previewed scene,
- identifying coordinate information of the candidate object in the previewed scene,
- identifying and displaying a plurality of objects related to the candidate object,
- detecting the at least one object selected from the plurality of objects related to the candidate object,
- forming the group by grouping the at least one object and the candidate object,
- detecting at least one effect selected from a plurality of effects,
- generating the object criteria based on the group and the at least one effect, and
- storing the object criteria in the electronic device.

12. The electronic device of claim 8, wherein the object criteria comprises information about the group and an effect to be applied, and
wherein information about the group indicates at least one of:
- availability of the objects in the group,
- coordinate information of the objects in the group, and
- a non-availability of the objects in the group.

13. The electronic device of claim 8, wherein the processor is further configured to:
- identifying whether the objects included in the group has at least one physical property defined in the object criteria, and identifying that the objects meet the object criteria, or
- identifying first coordinate information of a first object included in the group and second coordinate information of a second object included in the group, identifying a distance between the first coordinate information and the second coordinate information, and identifying whether the first object and the second object meet the object criteria based on the distance.

14. The electronic device of claim 8, wherein the one or more effects comprises at least one of a visual effect, an audio effect, an audio-visual effect, and a haptic effect.

15. A non-transitory computer-readable storage medium storing instructions that when executed by at least one processor, cause the at least one processor to perform at least one operation comprising:
- previewing a scene in a field of view (FOV) of a camera of an electronic device;
- detecting available objects in the previewed scene;
- detecting a user input on a candidate object of the available objects
- identifying the candidate object in response to detecting the user input, and at least one object associated with the candidate object based on a training dataset, from among the available objects;

identifying one or more effects to be applied on a group including the candidate object and at least one object; and applying the one or more effects on the group according to an object criteria determined based on first coordinate information associated with a first object included in the group matching second coordinate information associated with a second object included in the group.

* * * * *